United States Patent
Olofsson et al.

(10) Patent No.: US 6,251,447 B1
(45) Date of Patent: Jun. 26, 2001

(54) PLATED MEAL WITH INDIVIDUALLY FROZEN INGREDIENTS AND METHOD OF THAWING AND HEATING

(75) Inventors: Mats Olofsson, Hjänarp; Lars Askman, Billesholm, both of (SE)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/226,249

(22) Filed: Jan. 7, 1999

(30) Foreign Application Priority Data

Jan. 19, 1998 (GB) ................................................ 98010697

(51) Int. Cl.$^7$ .................................. A23L 1/39; A23L 1/01
(52) U.S. Cl. .................................. 426/90; 426/92; 426/96; 426/100; 426/107; 426/113; 426/234; 426/394; 426/407; 426/589; 426/393; 426/114
(58) Field of Search .................................. 426/113, 114, 426/107, 589, 120, 393, 90, 92, 100, 96, 234, 394, 407

(56) References Cited

U.S. PATENT DOCUMENTS

| | | | |
|---|---|---|---|
| 2,674,536 | * 4/1954 | Fisher | 426/114 |
| 2,801,930 | * 8/1957 | Paulucci | 426/113 |
| 3,219,460 | * 11/1965 | Brown | 426/114 |
| 3,235,390 | * 2/1966 | Vischer | 426/114 |
| 3,240,610 | * 3/1966 | Cease | 426/113 |
| 3,271,169 | * 9/1966 | Baker et al. | 426/114 |
| 3,681,094 | * 8/1972 | Rogers et al. | 426/113 |
| 4,081,646 | 3/1978 | Goltsos | 426/107 |
| 4,210,674 | 7/1980 | Mitchell | 426/107 |
| 4,328,254 | * 5/1982 | Waldburger | 426/114 |
| 4,456,164 | * 6/1984 | Foster et al. | 426/113 |
| 4,574,174 | * 3/1986 | McGonigle | 426/114 |
| 4,929,456 | 5/1990 | Bejarano-Wallens et al. | 426/99 |
| 5,077,066 | 12/1991 | Mattson et al. | 426/234 |
| 5,987,898 | * 11/1999 | Olofsson | 426/589 |

FOREIGN PATENT DOCUMENTS

| | | | |
|---|---|---|---|
| 361893 | * 4/1990 | (EP) | 426/113 |
| 0 533 959 A1 | 3/1993 | (EP) . | |
| 0 835 615 A1 | 4/1998 | (EP) . | |
| 2199235 | * 7/1988 | (GB) | 426/113 |
| 1 327 422 | 8/1993 | (GB) . | |
| 3-277244 | * 9/1991 | (JP) | 426/113 |
| WO 96/28050 | 9/1996 | (WO) . | |

OTHER PUBLICATIONS

Packaging Encyclopedia 1987, Canners Publ., p. 21.*
Package Engineering Sep. 1981.*
Pastics Technology, p. 61 Plus, Dec. 1985.*

* cited by examiner

Primary Examiner—Steven Weinstein
(74) Attorney, Agent, or Firm—Winston & Strawn

(57) ABSTRACT

The invention relates to a plated frozen meal comprising a plate, a first group of individually frozen predominantly meat-based ingredients positioned on the plate, a second group of individually frozen predominantly carbohydrate-based or predominantly vegetable-based ingredients positioned on the plate, and at least one pellet of frozen sauce. The at least one pellet of frozen sauce is positioned such that when it thaws it facilitates the thawing or heating of at least one of the first or second groups of ingredients. This invention is also directed to a method of increasing the rate of thawing or heating of a frozen plated meal.

12 Claims, 2 Drawing Sheets

PLATED MEAL WITH INDIVIDUALLY FROZEN INGREDIENTS AND METHOD OF THAWING AND HEATING

FIELD OF THE INVENTION

The present invention relates to a plated frozen meal and to a method for preparing same.

BACKGROUND OF THE INVENTION

The use of individually quick frozen ingredients (IQF) in stir-fried meals is well known. In such meals, the vegetable and meat ingredients are all of roughly the same size. Typically, these ingredients are about 0.5 cm to 1 cm long, and weigh no more than 10 grams. During the preparation of these stir-fried meals, a pan is filled with the ingredients and heated while the ingredients are stirred. Such meals can be prepared in about 10 minutes, but require that the consumer be involved during their preparation. This is because different ingredients heat at different rates, and because some heat-sensitive ingredients such as sauces can change in consistency or flavor if allowed to become too hot.

U.S. Pat. No. 5,077,066 discloses a combination of frozen food constituents and dried sauce concentrate on a tray, and the addition of water to the tray prior to heating its contents in a microwave oven. During preparation of the meal, the tray is preferably removed from the oven and the ingredients therein stirred before it is again returned to the microwave oven. This mixing may be necessary to dissolve the dried sauce concentrate and bind the resulting sauce to the meal ingredients.

Other plated meals are known that contain IQF ingredients upon which a liquid sauce is dosed. These meals enable easy variation of the IQF ingredients in the manufacturing of frozen meals comprising them, but like that disclosed by U.S. Pat. No. 5,077,066, their preparation requires stirring even thawing and heating is desired.

The lack of uniform and quick heating is typically less substantial for packages containing food products of the same type and size, such as packages of even sized meatballs or vegetables. There exists a need, however, for a frozen meal that contains ingredients that are preferably not mixed and yet requires little or no stirring by the consumer during its preparation. This need is particularly acute for meals that contain ingredients of different sizes, instead of those wherein the ingredients are substantially of equal size and measure only about 1 to 3 cm in length.

SUMMARY OF THE INVENTION

The present invention is directed to plated frozen meal comprising: a plate; a first group of individually frozen predominantly meat-based ingredients positioned on the plate; a second group of individually frozen predominantly carbohydrate-based or predominantly vegetable-based ingredients positioned on the plate; and at least one pellet of frozen sauce. Preferably, the positions of the first and second groups of ingredients each remain substantially the same upon thawing of the meal, and the at least one pellet of frozen sauce is positioned such that when it thaws it facilitates the thawing or heating of at least one of the first or second groups of ingredients.

In a particular embodiment, the plated frozen meal comprises a third group of individually frozen predominantly carbohydrate-based or predominantly vegetable-based ingredients positioned on the plate.

This invention also encompasses a method of increasing the rate of thawing or heating of a frozen plated meal that contains a first group of individually frozen predominantly meat-based ingredients and a second group of individually frozen predominantly carbohydrate-based or predominantly vegetable-based ingredients. This method comprises providing at least one pellet of frozen sauce, and positioning the at least one pellet of frozen sauce such that when it thaws it facilitates the thawing or heating of at least one of the first or second groups of ingredients.

One embodiment of this method further comprises positioning the first and second groups of frozen ingredients in such a manner that each remains in substantially the same place upon thawing or heating of the frozen plated meal.

BRIEF DESCRIPTION OF THE FIGURES

Preferred embodiments of this invention are described below with reference to the drawings.

DETAILED DESCRIPTION OF THE PREFERRED EMBODIMENTS

Figure 1:
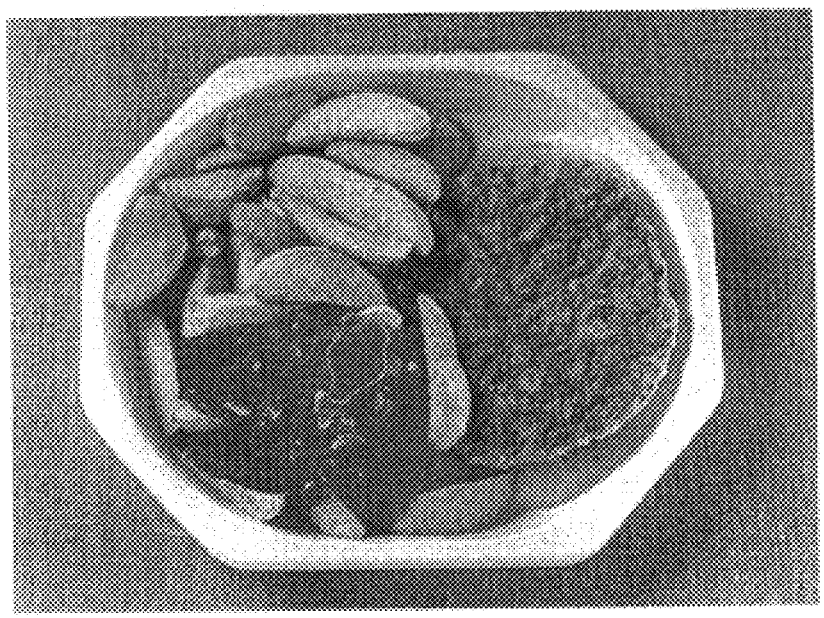
FIG. 1 shows a conventional frozen meal with a liquid sauce.
Figure 2:
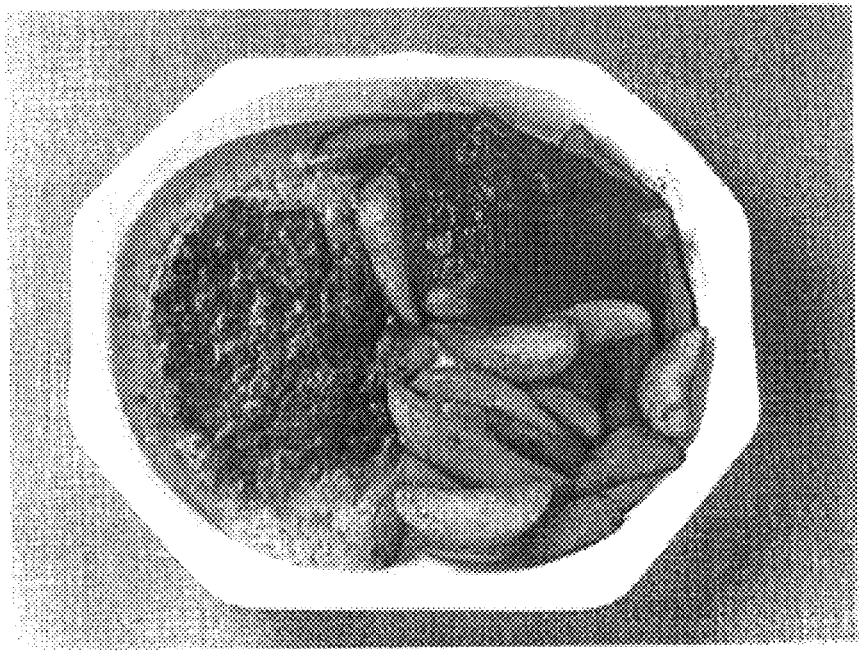
FIG. 2 shows the conventional frozen meal of FIG. 1 after heating.

The present invention is directed to a ready-to-eat meal that requires little involvement by the consumer during its thawing and heating. This meal is preferably individually packaged.

One aim of the invention is to provide a convenient meal for catering purposes. Another aim is to provide a meal comprising ingredients that are evenly cooked during heating. A further goal of the present invention is to provide a plated meal which appears as if its ingredients had been individually heated and arranged on the plate.

Accordingly, a method of increasing the rate of thawing or heating of a frozen plated meal is provided. This plated meal contains a first group of individually frozen predominantly meat-based ingredients and a second group of individually frozen predominantly carbohydrate-based or predominantly vegetable-based ingredients. The method comprises providing at least one pellet of frozen sauce, and positioning the at least one pellet of frozen sauce such that when it thaws it facilitates the thawing or heating of at least one of the first or second groups of ingredients.

This method provides the plated frozen meals of the invention. These frozen meals comprise a plate, a group of individually frozen, predominantly meat-based ingredients, a frozen sauce, and at least one of a group of individually frozen, predominantly carbohydrate-based ingredients or a group of individually frozen, predominantly vegetable-based ingredients. The predominantly meat-based and predominantly carbohydrate-based and/or predominantly vegetable-based ingredients are arranged such that they remain in substantially the same places on the plate upon thawing and heating of the meal. The sauce is preferably in pellet form, and upon thawing aids in the rapid or even thawing and heating of the other meal ingredients.

It has been found that liquid sauces tend to associate IQF ingredients in a manner that results in their agglomeration during the manufacturing freezing process. The resulting blocks of food tend to be more difficult to thaw and heat than their individually frozen components.

These problems are overcome by the present invention. This invention provides individually frozen sauces that are distinct and separate components of IQF meals. These distinct and separate components are preferably in the form of at least one pellet.

It has also been found that under certain conditions, the individual freezing of all the ingredients in a plated meal allows for rapid heating of the meal in comparison with conventional plated meals. In particular, it has been discovered that rapid and even heating of plated meal ingredients can be further enhanced by adjustment of the spatial arrangement of the ingredients on the plate. For example, the positioning of one or more sauce pellets close to meal ingredients that do not thaw or heat quickly can increase the thawing and heating rate of the entire plated meal.

The plated meals of this invention may be heated from the frozen condition in about 30 minutes to about 45 minutes in a conventional oven, and in about 5 minutes to about 7 minutes in a microwave oven. By contrast, a conventional frozen meal wherein liquid sauce was frozen after addition to the other ingredients takes between 8 minutes and 10 minutes to heat in a microwave oven.

An IQF meal of the present invention comprises at least one sauce pellet, a group of individually frozen, predominantly meat-based ingredients, and at least one of a group of individually frozen, predominantly carbohydrate-based ingredients or a group of individually frozen, predominantly vegetable-based ingredients.

According to the present invention, the group of individually frozen predominantly meat-based ingredients comprises, for example, meat, poultry, or fish meat in pieces that range from about 1 to about 200 grams. This invention is particularly useful for larger IQF ingredients such as whole chicken breasts or meat or fish fillets, in which case the size of the ingredients can range from about 50 to about 200 grams. The invention is also suitable for the manufacture and preparation of meals comprising IQF ingredients ranging in size from about 20 to about 50 grams. Conventional frozen meals such as those discussed above do not contain ingredients of these sizes. In a specific embodiment of the invention, the group of predominantly meat-based ingredients constitutes from about 10 to about 50 weight percent of the entire frozen meal.

The group of individually frozen, predominantly carbohydrate-based ingredients preferably comprises ingredients such as rice, pasta, and potato.

The group of individually frozen, predominantly vegetable-based ingredients preferably comprises at least one of carrots, peas, peppers, beans, or wheat corns. The vegetables are preferably blanched to increase food safety, and may be whole or cut into pieces. For example, an IQF meal of the invention may comprise whole potatoes.

Meals of the present invention may also contain large IQF pieces that are predominately vegetable-based or predominantly carbohydrate-based. For example, a meal may comprise an IQF lasagne portion or an IQF-filled pancake.

The meat-based and carbohydrate-based or vegetable-based ingredients of the meal are preferably pre-cooked or edible upon thawing. Pre-cooking may not be necessary, however, for ingredients that require little cooking, such as fish meat or prawns.

The sauce pellets of the meals of this invention preferably weigh from about 1 to about 10 grams. Each pellet preferably has a water content of between about 75 percent to about 98 percent by weight of the pellet, more preferably of between about 75 percent to about 95 percent by weight of the pellet, and most preferably of about 90 percent by weight of the pellet.

As discussed above, it has surprisingly been found that the position of one or more sauce pellets in relation to the other plated meal ingredients can increase the thawing and heating rate of the plated meal. To be specific, it has been found that sauce pellets tend to heat more rapidly as compared to other IQF meal ingredients, and can facilitate the heating of those ingredients when placed adjacent to them. The sauce pellets of the meals of this invention tend to heat more rapidly than other meal ingredients especially when the meals are thawed and heated in microwave ovens. This has been attributed to the relatively high water content of the sauce pellets.

In a particularly advantageous embodiment of the present invention, sauce pellets in a plated meal abut individually frozen ingredients having the slowest thawing or heating rate of the meal ingredients. In general, the ingredients with the slowest thawing rates are those with the lowest water content. Ingredients with the lowest water content tend to be those comprising, for example, meat, chicken or fish parts.

Other parameters, such as shape, size, and salt content can also influence the thawing and heating rate of an ingredient. Sauce pellets may thus, for example, be positioned adjacent to IQF ingredients that are larger than other ingredients on the plate. In this way, quick and even heating of the plated meal can occur despite the fact that the sizes and types of its ingredients vary.

In a preferred embodiment of the invention, pellets of frozen sauce are layered with at least part of the group of individually frozen, predominantly meat-based ingredients, as these ingredients tend to thaw more slowly than the sauce. The sauce pellets and the predominantly meat-based ingredients are layered so as to increase the contact surface between the sauce and the meat-based ingredients upon thawing of the sauce, thus increasing the thawing and heating rate of the meat-based ingredients.

Consequently, a plated meal made in accordance with this invention can contain sauce pellets that are positioned above and beneath at least part of the group of individually frozen, predominantly meat-based ingredients so as to provide contact between the pellets and meat-based ingredients. Such an arrangement is especially useful when the frozen, predominantly meat-based ingredients constitute from between about 20 to about 50 weight percent of the meal, and when the meat-based ingredients comprise one or more relatively large pieces of meat, such as fillets of chicken or fish, or a hamburger.

In another embodiment of the present invention, the plate upon which the meal is arranged is transparent to microwaves. This facilitates the quick and even cooking of the meal in a microwave oven. The plate may thus be made of a plastic material that withstands freezing and heating in both microwave and conventional ovens. Suitable materials include, for example, plastics or plastic/paper laminates such as crystalline polyester, paper coated with crystalline polyester, and polypropylene.

A particular advantage of the present invention is the ease and flexibility of manufacturing that it provides. The use of individually frozen sauces, carbohydrate-based groups, vegetable-based groups and meat-based groups allows easy combination of the same ingredients in a variety of different ways. Meals encompassed by this invention may not, however, be assembled in a random manner, as consideration should be given to the size and water content of the ingredients in order to provide their even cooking with a minimum of stirring during preparation. Nevertheless, the fact that the ingredients are individually frozen makes it possible to make on-line variations in the composition of the meal.

The beneficial aspects of the present invention are further apparent from the following, non-limiting example.

EXAMPLE

In order to determine some of the benefits provided by plated meals made in accordance with the present invention, meals shown in the Figures were prepared with the following ingredients:

a beef burger (pre-cooked), 90 grams;

potatoes, 150 grams cut into up to 5 to 10 gram pieces (pre-cooked);

Bearnaise sauce, 90 grams; and tomato sauce, 60 grams; to yield a total meal of 390 grams. The beef burger and the potatoes were individually frozen and arranged side-by-side.

FIG. 1 shows a conventional frozen meal made of the listed ingredients. The Bearnaise sauce and the tomato sauce were dosed in liquid form respectively around the beef burger and onto the potatoes and then frozen.

Figure 3:
FIG. 3 shows a frozen plated meal according to the present invention.
Figure 4:
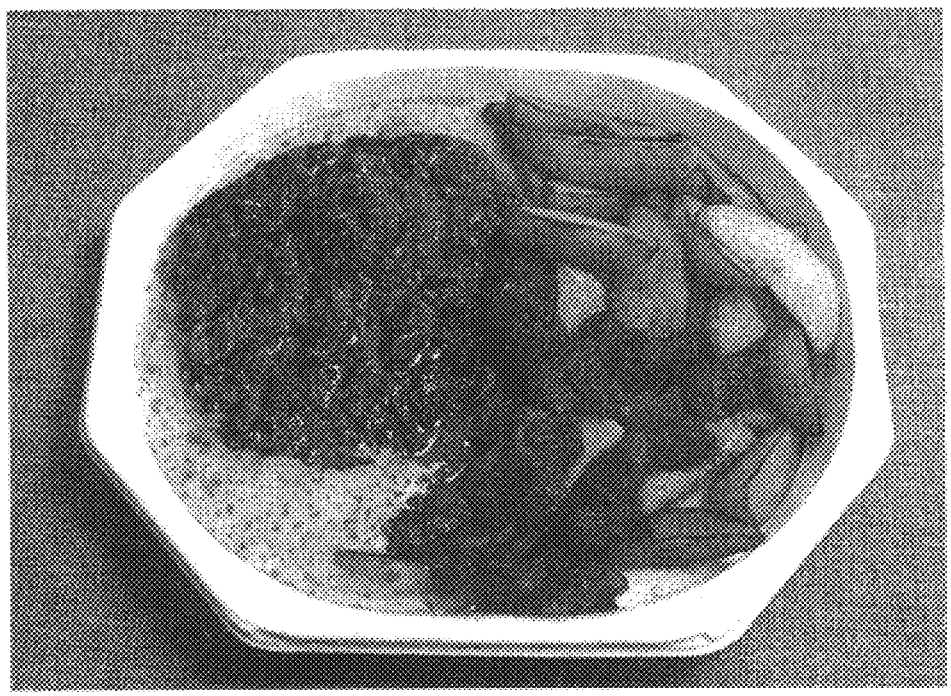
FIG. 4 shows the frozen plated meal of FIG. 3 after heating.

FIG. 3 shows a meal prepared according to the method of this invention wherein the Bearnaise sauce and tomato sauce were frozen into pellets, and the pellets arranged on the beef burger and potatoes, respectively. All the ingredients in the meal shown in FIG. 3 are IQF.

In order to determine the time required to prepare the meals of FIGS. 1 and 3, holes were made in the bases of the plates through which the temperatures of the meals could be measured. Cooking tests were performed using a microwave oven (700 W). A desirable minimum temperature of the meal ingredients is about 75° C., and the meals were heated until the coldest spot reached this temperature. For the meals shown in FIGS. 1 and 3, the coldest spot, or the spot in the meal that takes the longest to heat, was at the center of the beef burger.

The time it took to heat a meal to the desired temperature was determined by heating a number of meals for different lengths of time and measuring the temperature at their coldest spots. The frozen meals were placed in a microwave oven and cooked for varying lengths of time, after which they were removed and left to rest for 1 minute. The temperature of each meal at its coldest spot was measured after this 1 minute resting time.

It was found that conventional meals, such as that shown in FIG. 1, required from 8.5 to 9 minutes of heating before the center of the beef burger reached 75° C. By contrast, IQF meals of the present invention, such as that shown in FIG. 3, required only 6.5 to 7 minutes to reach the same temperature. An even heating of the IQF meal of FIG. 3 was thus obtained in a shorter period of time as compared to the conventional frozen meal of FIG. 1.

During preparation of the conventional and IQF meals shown in FIGS. 1 and 3, respectively, the Bearnaise sauce reached a temperature of about 110° C. The longer heating of the conventional meal as compared to that of the IQF meal, however, caused the Bearnaise fat and water emulsion to separate into two phases. Clearly, such a longer heating time would also be undesirable if other heat sensitive ingredients were included in the meal.

The foregoing embodiments are not to be understood as limiting the scope of this invention, and their equivalents are within its scope. The invention is further defined with reference to the claims appended hereto.

What is claimed is:

1. A plated frozen meal intended to be heated in a microwave oven comprising:

a plate adapted to allow the passage of microwaves therethrough;

a first group of individually frozen predominantly meat-based ingredients positioned on the plate;

a second group of individually frozen ingredients selected from the group consisting of carbohydrate-based and vegetable-based ingredients positioned on the plate; and frozen sauce pellets having a water content of between about 75% and 98% by weight of each pellet; wherein the frozen sauce pellets are positioned in layers both above and beneath the first group of individually frozen ingredients in a manner effective to provide a surface of contact of the pellets with said first group of individually frozen ingredients to reduce time for microwave thawing of said first group of individually frozen ingredients and also to even the heating of the ingredients of the meal, and wherein the positions of the first group of ingredients and the second group of ingredients each remain substantially the same upon thawing of the meal and without stirring being necessary before consumption.

2. The plated frozen meal of claim 1 wherein at least one of the groups of individually frozen ingredients weights at least about 50 grams.

3. The plated frozen meal of claim 1, wherein said plated frozen meal is individually packaged.

4. The plated meal of claim 1 wherein the frozen sauce pellets have a water content of between about 90 percent and about 98 percent by weight of the pellets.

5. The plated meal of claim 1 wherein the frozen sauce pellets have a water content of between about 90 percent and about 95 percent by weight of the pellets.

6. The plated meal of claim 1 wherein the frozen sauce pellets have a water content of about 90 percent by weight of the pellets.

7. The plated meal of claim 1 wherein the first group of individually frozen predominantly meat-based ingredients weighs between about 50 and about 200 grams each, and wherein the sauce pellets weigh between about 1 and about 10 grams each.

8. A method of increasing the rate of thawing or heating of a frozen plated meal, which method comprises:

providing a plate adapted to allow the passage of microwaves therethrough;

providing a first group of individually frozen predominantly meat-based ingredients positioned on the plate;

providing a second group of individually frozen ingredients selected from the group consisting of carbohydrate-based and vegetable-based ingredients positioned on the plate; and providing frozen sauce pellets having a water content of between about 75% and 98% by weight of each pellet;

positioning the frozen sauce pellets in layers both beneath and above the first group of individually frozen ingredients in a manner effective to provide a surface of contact of the pellets with said first group of individually frozen ingredients to reduce thawing time and to promote even heating of the ingredients of the meal;

thawing and heating the meal in a microwave oven while not disturbing the first and second groups of ingredients such that each remains in substantially the same place in the meal upon thawing and heating and without stirring being necessary before consumption.

9. The method of claim 8 wherein the frozen sauce pellets have a water content of between about 90 percent and about 98 percent by weight of the pellets.

10. The method of claim 8 wherein the frozen sauce pellets have a water content of between about 90 percent and about 95 percent by weight of the pellets.

11. The method of claim 8 wherein the frozen sauce pellets have a water content of about 90 percent by weight of the pellets.

12. The method of claim 8 wherein the frozen sauce pellets have a water content of between about 75 percent and about 90 percent by weight of the pellets.

* * * * *

UNITED STATES PATENT AND TRADEMARK OFFICE
CERTIFICATE OF CORRECTION

PATENT NO. : 6,251,447 B1
DATED : June 26, 2001
INVENTOR(S) : Olofsson et al.

It is certified that error appears in the above-identified patent and that said Letters Patent is hereby corrected as shown below:

Title page,
At "[75] Inventors", change the city of residence of the first-named inventor from "Hjänarp" to -- Hjärnarp --.

At "[30] Foreign Application Priority", change the number of the priority application from "98010697" to -- 9801069.7 --.

Signed and Sealed this

Thirteenth Day of November, 2001

Attest:

Nicholas P. Godici

NICHOLAS P. GODICI
*Attesting Officer*    *Acting Director of the United States Patent and Trademark Office*